No. 733,462. PATENTED JULY 14, 1903.
E. F. DELÉRY.
AUTOMATIC WEIGHING MACHINE.
APPLICATION FILED JAN. 22, 1903.
NO MODEL. 3 SHEETS—SHEET 3.
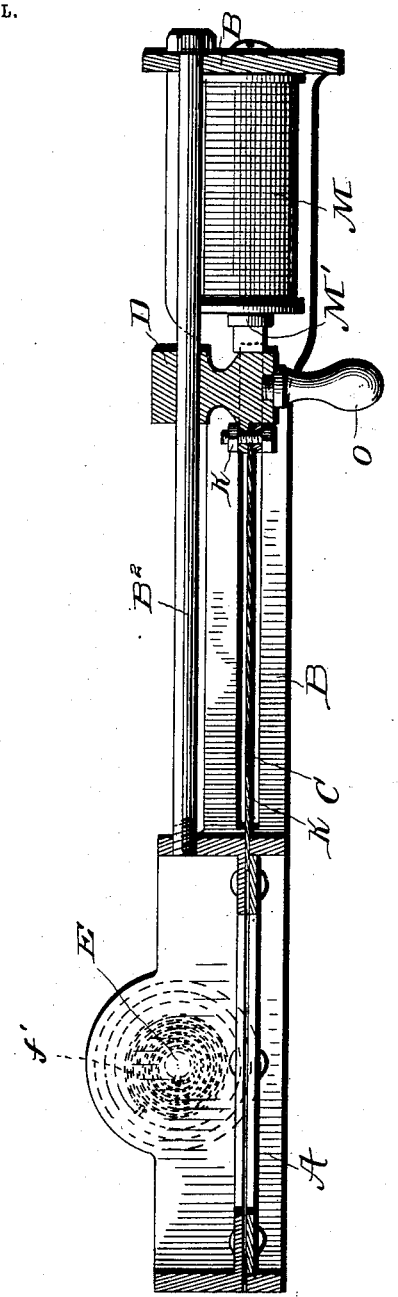
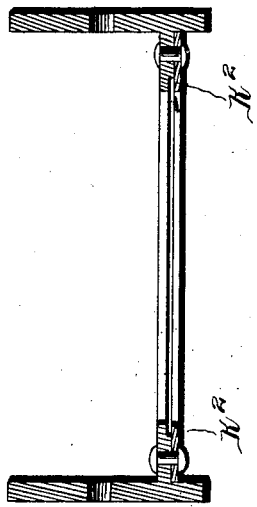

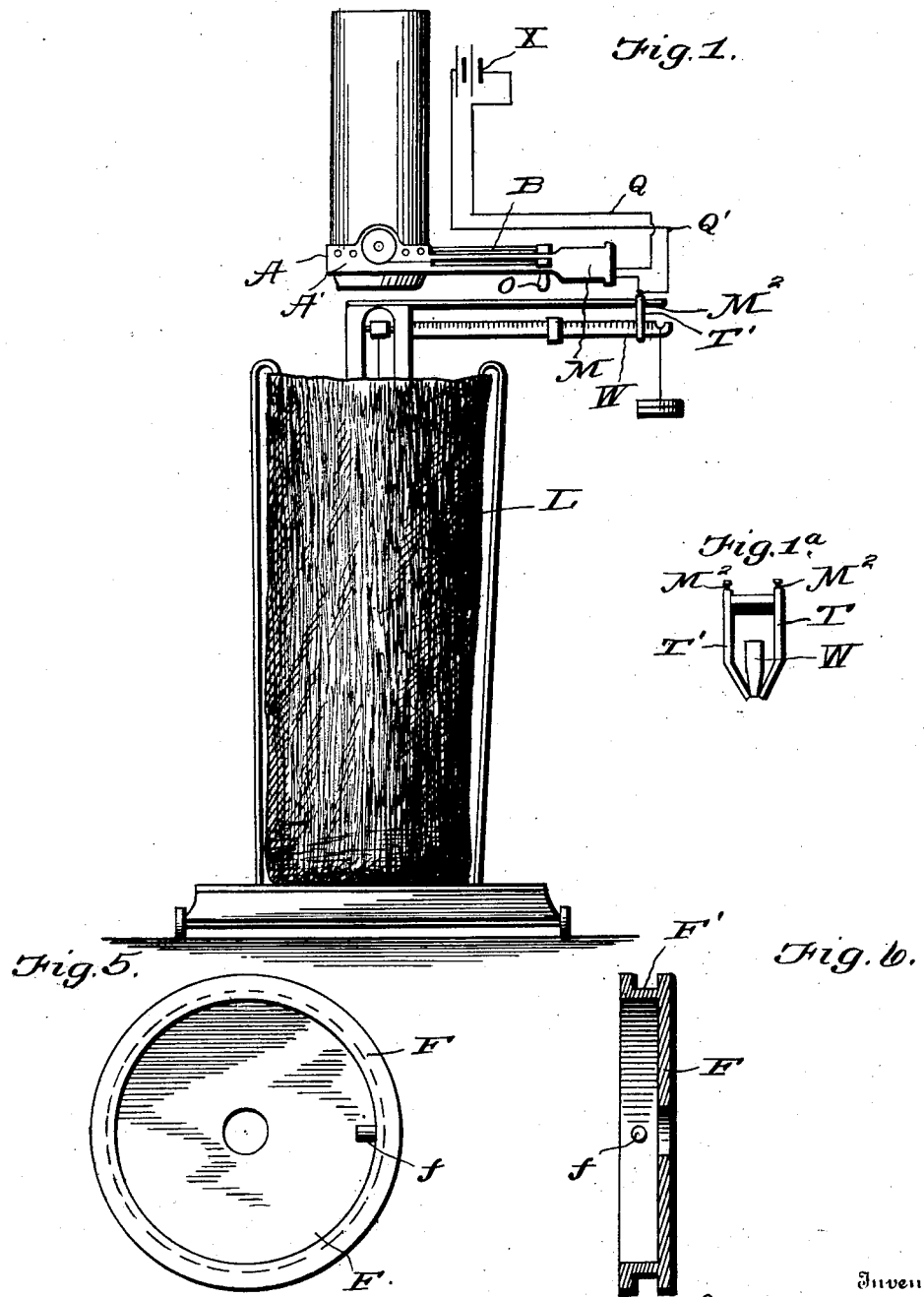

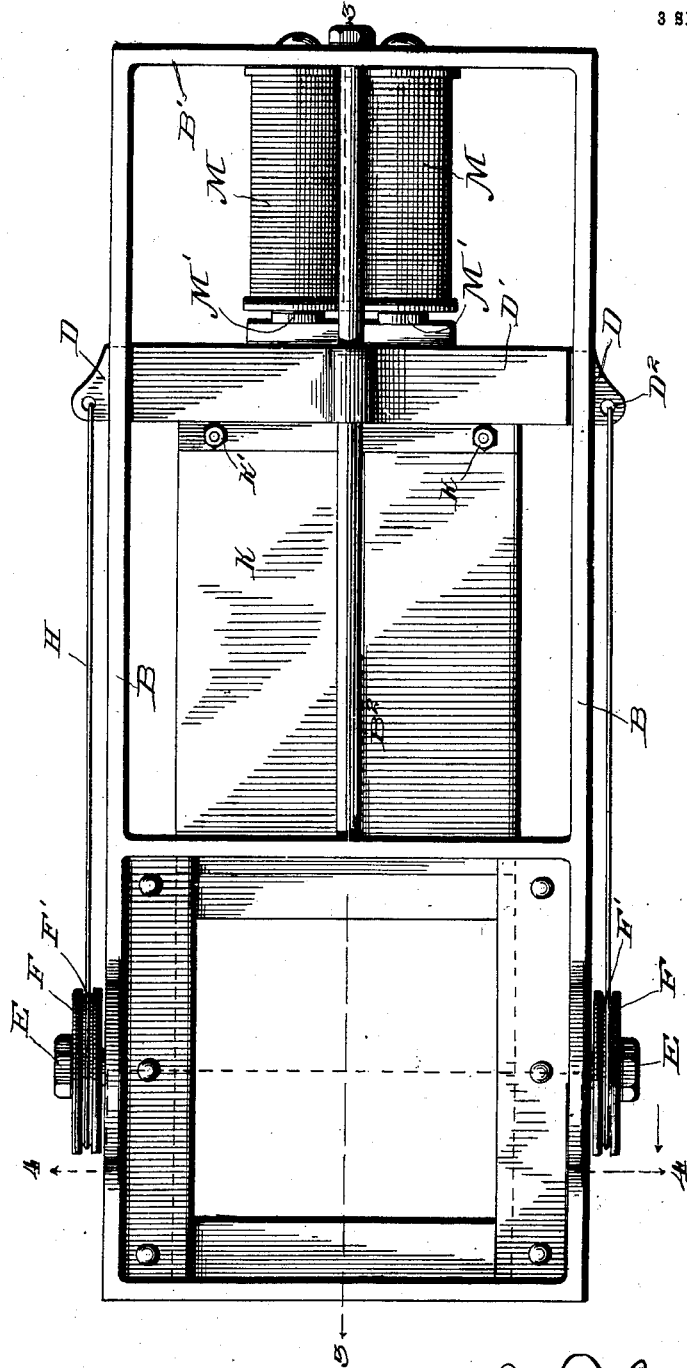

No. 733,462. Patented July 14, 1903.

UNITED STATES PATENT OFFICE.

EUGENE F. DELÉRY, OF NEW ORLEANS, LOUISIANA.

AUTOMATIC WEIGHING-MACHINE.

SPECIFICATION forming part of Letters Patent No. 733,462, dated July 14, 1903.

Application filed January 22, 1903. Serial No. 140,155. (No model.)

*To all whom it may concern:*

Be it known that I, EUGENE F. DELÉRY, a citizen of the United States, residing at New Orleans, in the parish of Orleans and State of Louisiana, have invented certain new and useful Improvements in Automatic Weighing-Machines; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in automatic weighing-machines, and especially in the provision of means for electrically holding a shutter or slide of a grain-feeding spout open under tension of spring connections and so arranged that when the scales balance the electric circuit will be broken and a magnet which holds the slide or shutter will become demagnetized, thus allowing the shutter to close under the influence of the spring-actuated connections therewith, thus cutting off the further feeding of grain.

The invention consists, further, in the provision of a frame which is adapted to be held to a grain-feeding spout and provided with a horizontal extension in which a slide or shutter has a reciprocating movement and in the provision of a handle for drawing back the slide or shutter under the influence of spring-actuated wheels about which cords or bands are wound and which are connected to the shutter or cross-head to which the shutter is connected, an electromagnet being provided which is electrically connected with any suitable electric source and normally energized when the scale-bar is at its lowest throw, said electromagnet being deënergized as the scale is balanced, thus allowing the shutter to be closed under the influence of spring-actuated mechanism.

The invention consists, further, in various details of construction and combinations of parts, which will be hereinafter fully described and then specifically defined in the appended claims.

My invention is clearly illustrated in the accompanying drawings, in which—

Figure 1 is an elevation of my device as applied to a pair of scales. Fig. 1ª is a detail view in elevation, showing the contact-points and their position with relation to the balancing-beam of the scale when the circuit is closed. Fig. 2 is a top plan view of the mechanism attached to a grain-feeding spout. Fig. 3 is a central longitudinal sectional view on line 3 3 of Fig. 2. Fig. 4 is a cross-sectional view on line 4 4 of Fig. 2, and Figs. 5 and 6 are details of the spring-carrying wheel.

Reference now being had to the details of the drawings by letter, A designates a spout-engaging frame which is held, by means of screws A' or other mechanism, to the spout, and projecting laterally from said frame are two parallel arms B B, which are connected together at one end by a cross-piece B', and in each of said arms is a longitudinal slot C, in which the plates D, which are fastened to the cross-head D', are adapted to slide.

Fastened to stub-shafts E, which are held in the opposite walls of the frame A, are wheels F, having grooved circumferences F', and on the inner circumference of said wheel is a lug $f$, to which one end of a coil-spring is connected, the other end being fastened to said stub-shaft. A band or rope (designated in the drawings by letter H) is fastened to the circumference of said wheel, and its other end is fastened in an aperture $D^2$ in one of said plates D. Each side of the apparatus has a similarly-constructed spring-actuated wheel and cord or band connections H with a plate D, said plates D being bolted or otherwise fastened to the cross-head D'. Intermediate the two arms B is a rod $B^2$, which serves as a guide on which the cross-head slides. Fastened to said cross-head is a shutter or slide K, bolted at K' to the cross-head, and the opposite edges of said shutter are guided in slots $K^2$, detail views of which are shown clearly in Fig. 4 of the drawings. When said shutter is in a closed relation within the frame A of the spout, the feeding of grain is shut off, and when drawn out into the position shown in Fig. 3 of the drawings communication is opened between the spout and a bag or other receptacle L, which may be supported by suitable means upon the platform of the scales, as shown in Fig. 1 of the drawings.

An electromagnet M is supported in any suitable manner to the cross-piece B', connecting the rear ends of said arms, and an armature M' is fastened to the cross-head B' and is adapted to be held by electrical influence against the coil M and designed to hold the shutter in the position illustrated in Fig. 3 when said electromagnet is energized, in which position said shutter is held under the influence of the springs mounted on said wheels F, and the moment said electromagnet is deënergized the springs will cause the shutter to be closed, and as the wheels containing said springs are caused to rotate the cords or bands connecting the shutter with the wheels wind about the latter. In order to draw the shutter out and throw the armature against the coil, I provide a handle O, which may be pivoted in any manner to the cross-head, as by means of threaded connection. (Illustrated in Fig. 3 of the drawings.)

Referring to Fig. 1 of the drawings, wires Q and Q' are provided, which are connected with any suitable source of electrical supply, one wire, as Q, being connected to the coil M, thence connected at $M^2$ to a metallic piece T, while the other wire, Q', is connected to a similar strip T' on the opposite side of the scale-beam W, and when said beam W is at its lowest throw it contacts with the inner faces of the lower inwardly-tapering pieces T and T' and closes the circuit, thus energizing the coil M, and consequently holding the armature against the coil. The moment the scale-beam balances and rises from contact with the two pieces T and T' the circuit is broken, the electromagnet is deënergized, and the shutter is thrown into a closed relation under the influence of the spring-actuated wheels, thus shutting off the flow of the article to be weighed.

From the foregoing it will be observed that by the provision of an apparatus embodying the features of my invention grain or other materials may be accurately weighed, the apparatus being easily and delicately regulated and may be used in connection with various kinds of weighing-scales.

While I have shown a particular construction of apparatus embodying the details of my invention, it will be understood that I may make slight alterations in the construction of the same without departing from the spirit of the invention.
Having thus fully described my invention, what I claim as new, and desire to secure by Letters Patent, is—

1. An automatic weighing apparatus comprising in combination with a pair of scales, a frame adapted for connection to a grain-feeding spout, an electromagnet supported by extended arms of said frame, a shutter guided by said arms, and a cross-head secured to said shutter, an armature carried by said cross-head and adapted to be held against an energized magnet, spring-actuated wheels mounted upon said frame, and connected to said cross-head, a circuit-closing device, and electric contact-points adapted to be closed by the scale-beam when the latter is at its lowest limit, said magnet adapted to be deënergized as the scale balances, allowing the shutter to close, as set forth.

2. An automatic weighing apparatus comprising in combination with a pair of scales, a frame adapted for connection to a spout, an electromagnet mounted upon laterally-extending arms of the frame, a cross-head guided in longitudinal slots in said arms, a shutter secured to said cross-head and adapted to slide in guideways in said frame and shut off the supply to a spout, spring-actuated wheels mounted on opposite sides of said frame, cords connected to said wheels and at their other ends to said cross-head, and contact-points supported adjacent to the scale-beam and with which scale-beam is adapted to contact when at its lowest throw, and electrical connections for energizing said magnet when the circuit is closed, said magnet adapted to be deënergized as the scale-beam is balanced, thereby allowing the shutter to close, as set forth.

3. An automatic weighing apparatus comprising in combination with a pair of scales, a frame adapted for attachment to the spout through which the material to be weighed is fed, laterally-projecting arms on said frame having elongated slots therein, an electromagnet supported by said arms and cross-head, plates secured to the ends of the cross-head and projecting through and guided in said slots, wheels journaled on the opposite sides of said frame, coil-springs mounted within said wheels, cords secured to said wheels and to the plates at the ends of said cross-head, a shutter working in grooves in the inner opposite walls of said frame and arms and fastened to said cross-head, an armature fastened to the cross-head, contact-points supported by the upright posts of the scales and against which the weighing-beam is adapted to contact, electric wires connecting said contact-points with a source of electric supply and said electromagnet and so arranged that when the weighing-beam is at its lowest limit, the circuit will be closed, and as the beam balances, the magnet will be deënergized and the shutter allowed to automatically close, as set forth.
4. An automatic weighing apparatus comprising in combination with a pair of scales, a frame adapted for attachment to a spout, laterally-projecting slotted arms upon said frame, a shutter mounted in grooves in the inner opposite walls of said frame, a cross-head, plates secured thereto, and projecting through and guided in said slots, a handle fastened to the cross-head, an electromagnet supported by said arms, a guide-bar projecting laterally from said frame, and upon which said cross-head is guided, contact-points mounted upon the upright posts of the scales, and against which the balancing-beam of the scale is adapted to contact when at its lowest throw, and electrical connections between said contact-points and magnet, and so arranged that when the beam of the scale is at its lowest limit, the magnet will be energized and the armature held in contact therewith, and said magnet be deënergized as the scale-beam balances, thus allowing the shutter to be automatically closed, as set forth.

5. An automatic weighing apparatus comprising in combination with a pair of scales, a frame adapted for attachment with a spout through which the material to be weighed passes, laterally-projecting slotted arms, a cross-piece connecting the same, a shutter sliding in grooves in the inner opposite walls of said frame and arms, a cross-head, plates secured to the ends of the cross-head, projecting through and guided in said walls, an electromagnet supported by said arms, an armature supported by said cross-head and adapted to be held against the magnet when the latter is deënergized, spring-actuated wheels journaled on the opposite sides of the frame, ropes secured to the circumferences of said wheels and fastened at their other ends to the ends of the cross-head plates, a laterally-projecting bar mounted on the posts of the scales, and two contact-plates fastened to said bar, said plates so positioned that the balancing-beam of the scales and the plates contact with each other when said beam is at its lowest throw, binding-posts secured to said contact-points, and electric wires secured to said plates, and electrical connections between one of said plates and the electromagnet, as set forth.

6. An automatic weighing apparatus comprising in combination with a pair of scales, a frame adapted for attachment to a spout, horizontally-projecting slotted arms on said frame, a shutter mounted in grooves in the inner walls of said frame and arms, a cross-head, plates secured thereto which are passed through and guided in said slots, stub-shafts mounted on the opposite walls of said frame, wheels with grooved circumferences mounted on said stub-shafts, a spring mounted at one end to the stub-shaft and its other to a lug on the inner face of said grooved wheel, a band secured at one end in said grooved circumference of each wheel, and fastened at its other end to said cross-head plate, an electromagnet supported by said arms, an armature fastened to said cross-head, a laterally-projecting arm mounted upon the scale-post, contact-plates fastened to said bar and adapted for contact with the balancing-beam of the scale when the same is at its lowest throw, electric wires connected to said contact-plates, and connections between one of said wires and the electromagnet, whereby when the scale-beam is at s lowest throw, the magnet is energized to hold the armature against the magnet and the shutter open, the latter being automatically closed as the scale-beam balances, and the magnet becomes deënergized, as set forth.

In testimony whereof I hereunto affix my signature in presence of two witnesses.

EUGENE F. DELÉRY.

Witnesses:
FRANK DELÉRY,
HENRY L. TARPY.